(No Model.)
S. R. BAILEY.
CARRIAGE AXLE.
No. 540,709. Patented June 11, 1895.
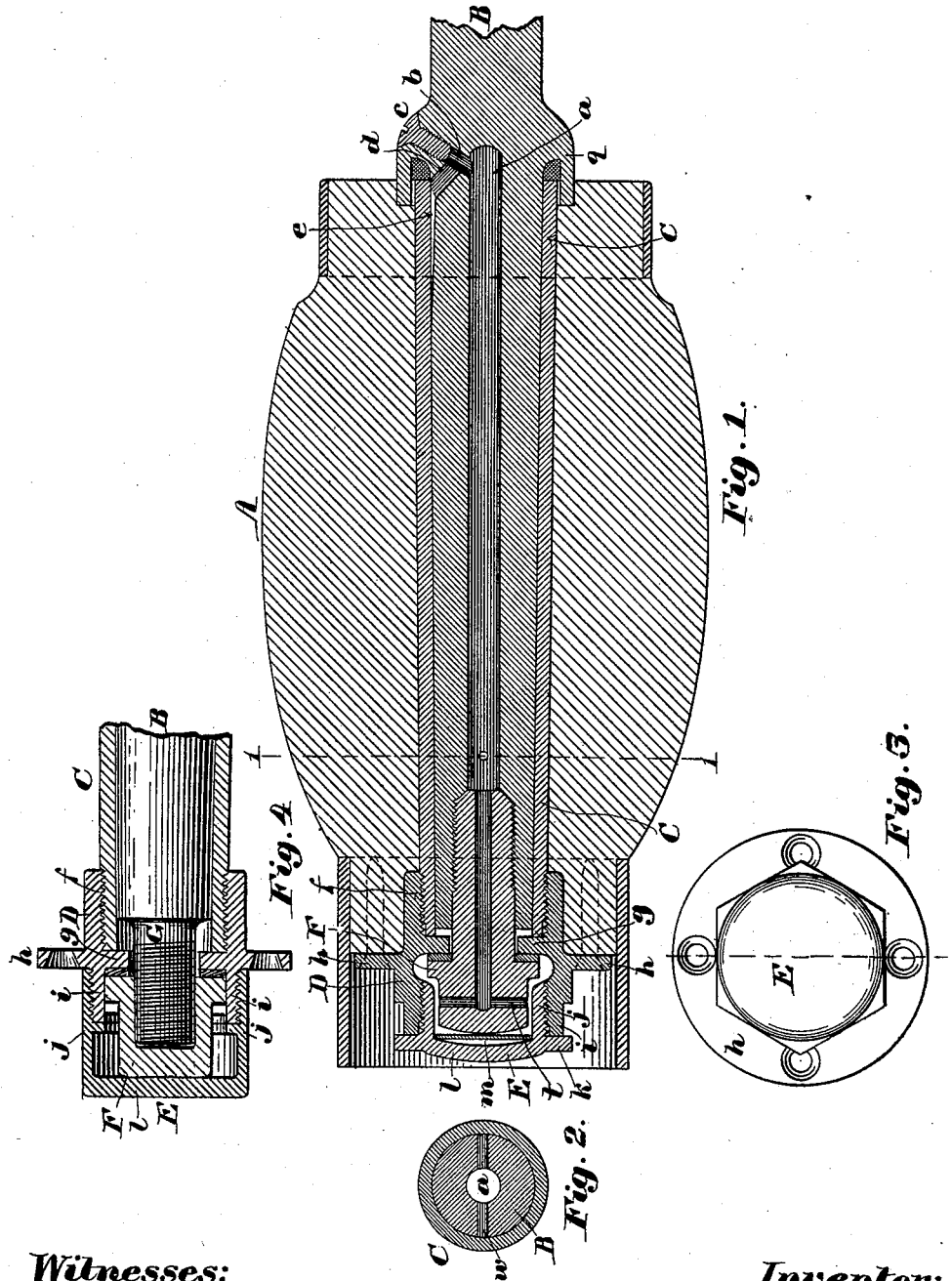
Witnesses:
Walter E. Lombard.
M. W. Brick
Inventor:
Samuel R. Bailey
per T. W. Porter Atty.

UNITED STATES PATENT OFFICE.

SAMUEL R. BAILEY, OF AMESBURY, MASSACHUSETTS.

CARRIAGE-AXLE.

SPECIFICATION forming part of Letters Patent No. 540,709, dated June 11, 1895.

Application filed August 4, 1894. Serial No. 519,459. (No model.)

*To all whom it may concern:*

Be it known that I, SAMUEL R. BAILEY, of Amesbury, in the county of Essex and State of Massachusetts, have invented a new and useful Improvement in Carriage-Axles, which will, in connection with the accompanying drawings, be hereinafter fully described, and specifically defined in the appended claim.

In said drawings, Figure 1 is a longitudinal central section of the axle and a hub in which it is inserted. Fig. 2 is a transverse section through the axle and box, taken as on line 1, Fig. 1. Fig. 3 is a front elevation of the outer cap. Fig. 4 is a longitudinal central section of the front portion of the box, the caps, and nut, slightly modified from those shown in Fig. 1, with the axle shown in elevation.

In said drawings, A represents a hub, introduced to show relations of parts, in which is secured the box C in which is arranged the axle B, the principal portion of the bed of which is broken away. In the arm of said axle is the axial hole or bore $a$ which terminates at collar $q$ and is vented at $b$, which vent is closed by screw $c$; an oblique hole $d$ leading from the short shallow groove $e$ on top of the axle to said vent $b$.

At the front or outer end of box C a cap D is firmly secured upon it, preferably by a screw thread as shown, and when the box is secured in hub A and cap D has been secured on the box the latter is then firmly secured to the hub by screws shown by dotted lines in Fig. 1, and the holes for said screws are shown in Figs. 3 and 4. Said cap D is formed with cylindrical part $f$. This is secured upon box C, with an internal flange $g$ that bears against the end of the box, an external flange $h$ through which said screws pass and a cylindrical part $i$ to which the front cap E is secured.

In Fig. 1, the nut F is threaded axially in B and it is formed with an axial passage that terminates at the small transverse passage $t$ as shown in Fig. 1, and the axle may if desired have a small hole $w$ formed through it.

In Fig. 4, cap D is at part $i$ threaded on the outside and part $j$ of cap E is threaded to pass over part $i$, and nut F is threaded upon its interior to engage part G of the axle.

At the rear end of box C is arranged a packing as shown for the mere purpose of arresting the outward flow of oil; but both the outer and inward wear of the axle are arrested by nut F which bears upon packing $m$, which may have a slight spring by bearing in cap E at its periphery only as shown in Fig. 1, or the nut may have a solid bearing as shown in Fig. 4, which arrests the inward inclination of the wheel; and the bearing between flange $g$ of cap D and the adjacent part of nut F receives the wear caused by the outward inclination of the wheel; and whether nut F is threaded in the axis of axle B or is threaded thereon no oil ever escapes at the front of the wheel. It must all pass the length of the box and escape at the rear end. When the axle is formed with passage $a$ the oil is introduced in passage $b$ and escaping through passage $t$ in nut F it passes to the rear of box C and finally escapes at the rear end thereof if at all.

When nut F is threaded upon axle B, it bears solidly against the extreme end of the axle instead of against a shoulder formed upon the axle at the inner end of part G. When a collar as D is secured upon box C, and it is also secured to hub A, then said box can be formed without fins and can be turned perfectly cylindrical its entire length and can be fitted and forced into hub A, with the required pressure, and it is held securely in position in the hub.

By forming cap D with an internal flange $g$, said cap bears against the entire outer end of box C and nut F has a bearing against said flange much wider than if said nut and box were formed in the usual manner.

Having thus described my invention, what I claim as new, and desire to secure, is—

The combination of axle B, box C, cap D screw threaded to the box and having the interior flange $g$ to abut against the end of said box; cap E threaded to cap D, and nut F screw threaded to the axle and formed to abut against the outer face of flange $g$, substantially as specified.

SAMUEL R. BAILEY.

Witnesses:
AUGUSTUS G. REYNOLDS,
T. W. PORTER.